Patented May 16, 1933

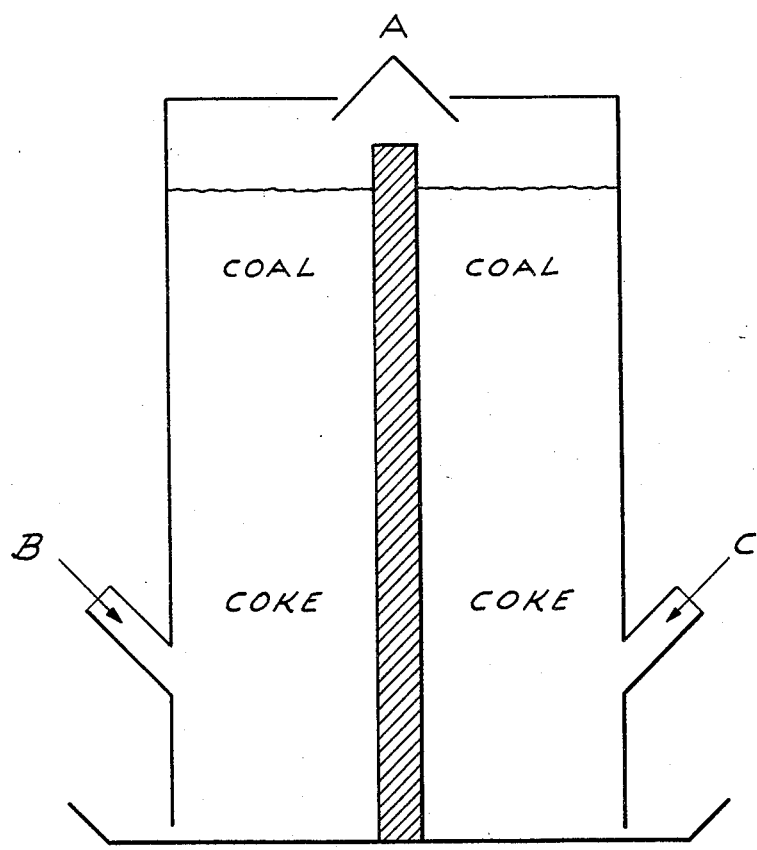

1,908,873

UNITED STATES PATENT OFFICE

DANIEL TYRER, OF NORTON-ON-TEES, ENGLAND, ASSIGNOR TO IMPERIAL CHEMICAL INDUSTRIES, LIMITED, OF LONDON, ENGLAND, A BRITISH COMPANY

PRODUCTION OF SULPHUR FROM SULPHUR DIOXIDE

Application filed June 10, 1931, Serial No. 543,349, and in Great Britain June 16, 1930.

This invention relates to the production of sulphur from sulphur dioxide by reduction with carbon at a high temperature. Hitherto, high temperature coke (from gas works or coke ovens) has been employed as reducing agent, but I have now found that low temperature coke (semi-coke) offers advantages by reason of its greater reactivity. Thus a lower reaction temperature, e. g. 600 to 800° C., may be used than with high temperature coke, with which temperatures of 800 to 1000° C. are required. I have further found that the heat of the sulphurous gases proceeding from the reduction may be utilized to carbonize coal and thereby produce semi-coke for use in the reduction process.

When the sulphurous gases are used for carbonizing the raw coal by direct contact with same, it is important to avoid contamination of the gases with the vapors arising from the distillation of the coal, as the presence of such vapors in the gas leads to trouble in the subsequent separation of the sulphur from the gas. I have found, however, that by causing the mixture of gases containing tar vapors, which is produced during the distillation of the raw coal, to traverse a bed of highly-heated coke, the tar vapors are decomposed and the resulting gas is obtained free from objectionable impurities so that the separation of the sulphur can be accomplished without hindrance.

The reduction of sulphur dioxide by the semi-coke may be carried out in any suitable manner, for example by passing the gas through a bed of lump semi-coke heated externally or by alternate passage of air or the sulphurous gas and air may be passed together through the semi-coke. The reduction of the sulphur dioxide may also be brought about by means of semi-coke in granular or pulverized form, in which case the gas may be forced through a bed of the material in such a manner as to cause turbulent motion therein, or the pulverized semi-coke may be dispersed in the sulphurous gas and the mixture exposed to a sufficiently high temperature.

In one form of the invention, illustrated in the accompanying drawing, the process is carried out in a pair of vertical retorts communicating at the top. Initially both retorts are partly charged, through A, with semi-coke and the charge is completed by feeding raw coal over the semi-coke; both retorts are then raised to red heat by an air blast admitted through ports B and C. A mixture of sulphur dioxide and air is then fed to the base of one retort through port B, the air being supplied in such an amount that the heat evolved by combustion of the semi-coke more than compensates for the heat absorbed in the reduction of sulphur dioxide, so that the process as a whole is exothermic. The resulting gases are passed upwardly through the superposed layer of raw coal, which becomes carbonized, and downwardly through the second retort, wherein the upper layer of raw coal also becomes carbonized. The gases, which now consist of a mixture of sulphur vapor, nitrogen and gases and vapors arising from the distillation of the raw coal, pass through the lower layer of semi-coke which has been initially raised to a high temperature, the tar vapors being thereby decomposed. The issuing gas from port C is treated for the recovery of sulphur in any suitable manner. Preferably the sensible heat of the gas is first recovered, e. g. by passage through a waste heat boiler.

The direction of gas flow is reversed periodically when the temperature of the final cracking zone has fallen to a certain level in order to utilize as the cracking zone the portion of the semi-coke bed first encountered by the sulphur dioxide-air mixture, this portion having become hotter as a result of the heat evolved in the reaction of the sulphur dioxide and oxygen in the gases introduced and the hot semi-coke. Fresh coal is supplied to the top of each retort in accordance with the amount consumed in the reaction.

Having now particularly described and ascertained the nature of my said invention, and in what manner the same is to be performed, I claim:

In a process of producing elemental sulphur involving the use as raw materials of sulphur dioxide, an oxygen containing gas and raw coal, the steps of (1) passing a mixture of sulphur dioxide and an oxygen containing gas through a bed of hot semi-coke, (2) passing the hot reaction gases obtained from step 1 over raw coal which is thereby carbonized to semi-coke, (3) passing the resulting mixture of reaction gases over hot coke obtained from a previous reaction step 1 and using the semi-coke obtained in step 2 for a subsequent reduction step 1.

In testimony whereof, I affix my signature.

DANIEL TYRER.